Sheet N° 1
2 Sheets

W. T. Nichols.
Excavator or Shovel.
N° 75783.  Patented Mar. 24, 1868

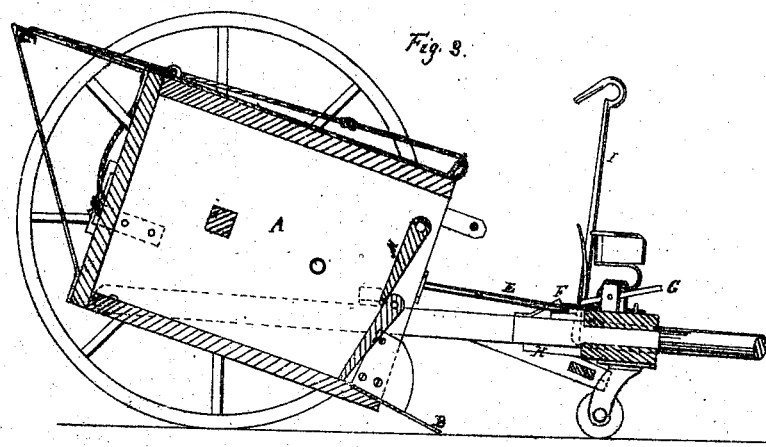
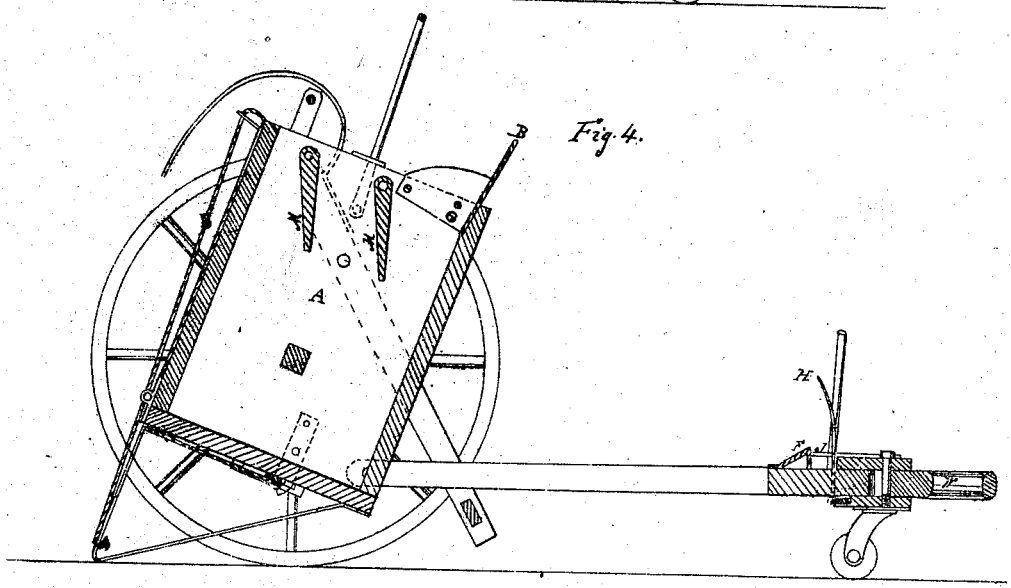

United States Patent Office.

W. T. NICHOLS, OF RUTLAND, VERMONT.

Letters Patent No. 75,783, dated March 24, 1868.

---

IMPROVED EXCAVATOR OR SHOVEL.

---

The Schedule referred to in these Letters Patent and making part of the same.

---

Be it known that I, W. T. NICHOLS, of Rutland, in the county of Rutland, and State of Vermont, have invented a new and useful machine for loading sand, dirt, or gravel upon wheels without the use of the hand-spade or shovel, which said machine I denominate a "Horse-Shovel;" and I do hereby declare that the following is a full, clear, and exact description of the construction and operation of the same, reference being had to the annexed drawings, making a part of this specification, in which—

Figure 1, in black lines, is a side view in the position of the machine being drawn from point to point.

Figure 3 is a side sectional view of the machine in the position of scraping or shovelling.

Figure 4 is a side sectional view in the position of being loaded by having the forward end of the box thrown up, so as to let the dirt fall to the rear.

Figures 1, 5:
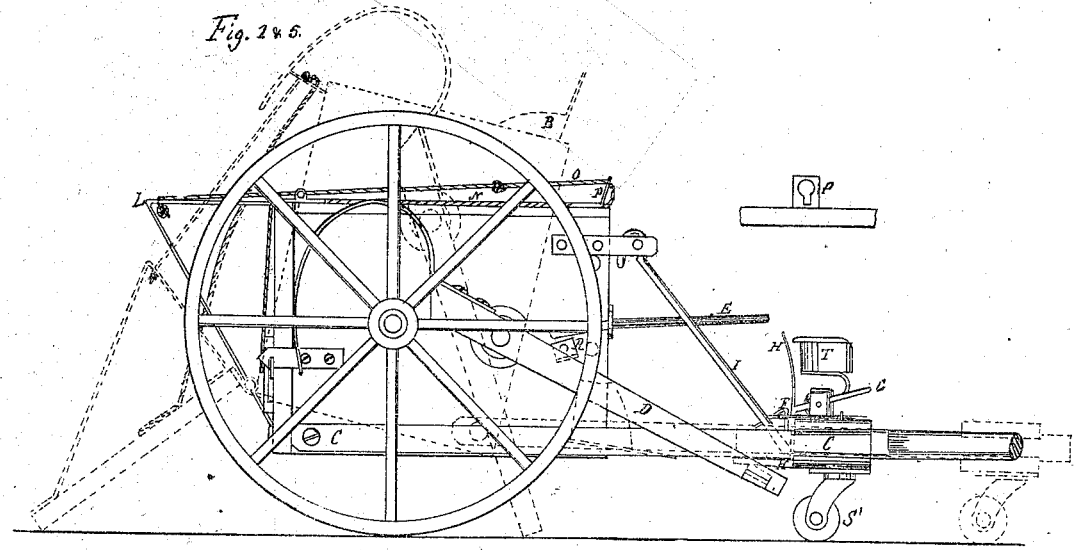
Figure 2:
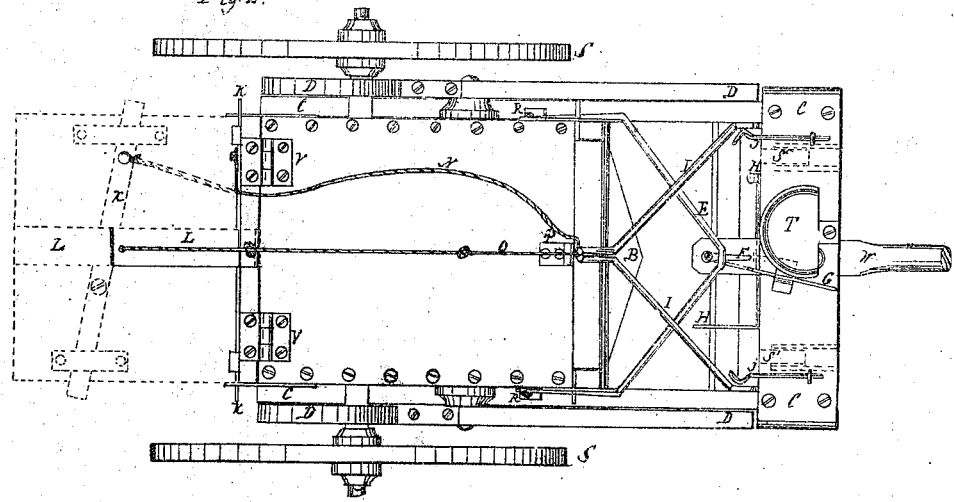
Figure 2 is a top view in the same position, i. e., being drawn from point to point.

Figure 5, in red lines, is a side sectional view of the machine being unloaded, by having the rear end of the box opened, and the forward end of the box thrown into an upright position, so as to let the dirt fall out at the rear.

A is the cart-box. B is the shovel or scraper, fastened to the cart-box A. C is the draught and connecting-frame, the same being fastened to the box at the rear and below the axle, and the horses attached to the forward end of said frame. D is the drop and hoist-lever, for throwing up the box to load and unload the same. E is the bail, to apply the draught to the front end of the box. F is the hook at the rear end of the slotted tongue, upon which the bail E fastens itself. G is the foot-lever, to throw the bail E off from the hook F. H is the hand-lever, to depress the drop and hoist-lever D into the ground. I is the hook-brace, to hold the box in position to be drawn from point to point. J is the spring, to hold the hook-brace I in position. K is the latch, to fasten the rear end of box in position. L is the triangular support, fastened upon the rear end of box, to hold the box from revolving too far to the rear when loading. M is the self-acting front-end board of the cart-box. N is the cord to open the latch at the rear end of box. O is the cord to draw open the rear end of box. P is the slotted plate, through which the cords N and O pass. Q is the gauge, fastened upon the side of the cart-box A, and resting on the connecting-frame C, to graduate the cutting-depth of the shovel B. S S are cart-wheels. S' S' are caster-wheels under draught-frame. T is driver's seat. U is tongue, to which team is attached, and with a slot, through which a bolt passes, letting the said tongue slide backwards and forwards. V is the hinge, holding the rear end of box to the upper side of said box.

A careful inspection of the drawings, and the explanations of the several parts lettered from A to V respectively, will probably give a better idea of the construction of the machine than a description in words; but, in general terms, the machine is made mainly of wood, mounted upon two cart-wheels, say five feet in diameter, and the draught and connecting-frame carried upon two caster-wheels, as shown.

The cart-box A is made of wood, say four and one-half feet long, more or less, by three feet deep, and three feet wide, more or less, the sides and top and bottom being securely fastened together, and the rear end being closed by a door, which is hung from the top of the rear end of the box by the hinges V, and when loading or moving from point to point, said rear-end door of box is latched and held in position by the latch K. The forward end of said cart-box is filled and closed by the self-acting front-end boards M M, which close up the front end of the box when the same is in a horizontal position, and open when said box is in an upright position. The scraper or shovel B is made of wrought or cast iron or steel, of the width of the cart-box, and is securely fastened to said box at the bottom and front end of the same, and revolves with said box. The cutting depth of said shovel is regulated by the gauges R R, which are fastened upon the sides of the cart-box A, and rest upon the connecting-frame C when said shovel is in the ground. The draught or connecting-frame is composed of two pieces of strong wood, which are fastened by a bolt through their ends to the lower and rear ends of the sides of the cart-box, and the other ends of said pieces composing said frame are connected together some feet in front of the cart-box by transverse pieces of wood, securely fastened together by bolts or rods, and the forward end of said frame is held in position by small wheels, either caster-wheels or otherwise, and the driver's seat is placed upon the front end of said draught-frame. The cart-box is carried by an axle passing through it, say eighteen inches from the bottom and rear end, and into the larger cart-wheels. The drop and hoist-levers D D are fastened and pivoted to the cart-box A at a point, say on a level with the axle, and eighteen inches in front of the same, and by means of lagging on the box are brought out so as to operate outside of the draught-frame. These levers are of sufficient length, and in front and below the draught-frame are connected by a cross-bar, which holds them together. The rear ends of these levers are constructed of sufficient weight, either of wood or metal, to counterbalance the front ends, and thus when the front ends are not actually in the ground, they will come to the lower side of the draught-frame by their own weight, and hence keep clear of any obstruction. The bail E is made of iron, the ends being fastened to the sides of the cart-box A, and said bail revolves with said box. When the box comes to the ground, the bail drops upon the hook F at the end of the slotted tongue, and the team is backed up, when the bail drops into the hook, and thus the draught of the team is transferred from the rear end of the box to the front end of the same. The hook-brace I is fastened at the ends near cross-pieces of the draught-frame, to the side-pieces of said frame, and the upper ends are joined in the form of a hook, shown in the drawings, and the whole thing swings upon the bolts with which it is fastened to the draught-frame, and is held in position by the springs J J, as shown in the drawing.

Having explained the particular construction of a sufficient number of parts to give an idea of the operation of those not specifically described, let it be supposed that the shovel has been dropped into the ground, and has scooped itself full, and that the driver wishes to load the dirt into the box: He places his foot upon the foot-lever G, and by pressing it down throws up the bail E from the hook F, which had held it, and thus the draught is at once transferred to the lower and rear end of the cart-box A. He then depresses the levers D D into the ground by pulling the hand-lever H, and the forward motion of the team at once throws the box into an upright position, and the self-acting front-end boards M M open and let the dirt which was in the shovel B fall by its own weight to the rear of the cart-box. The driver then backs his team and the cart-box comes down, bringing the shovel into the ground at the point it went out, and the drop-levers rise to their position, and the bail E drops into the hook at the end of the slotted tongue, and thus the draught is again transferred to the front end of the box, and the machine is ready to go forward and take up another shovelful of dirt and deposit the same in the cart-box. This operation is repeated till the cart-box is full. When full, the driver pushes upon the hook-brace I, which throws it out of the spring F, and it falls upon the cross-rod at the front end of the cart-box, and he then depresses the drop-levers D D in the usual way, and having changed the draught to the rear in the usual way, the cart-box rises to a level position, when the brace-hook I grapples the cross-rod of the cart-box and holds the box in a level and horizontal position, when the team is backed enough to let the drop-levers rise to their position, and the driver then drives the loaded box to its point of destination. Having arrived at the point where he wishes to unload, he goes through the same operation as in loading, except that he first opens the rear end of the box by means of the cords N and O, and holding the same open by drawing a knot in the cord O through a slot in the plate P. After unloading, the knot in the cord O is raised in the slot of plate P, and the rear-end door drops down and fastens itself by means of the latch. The remainder of the operation to put the machine in position is the same as in loading, and will not need any further description.

Having thus explained the construction and operation of my invention, what I claim as new, and desire to secure by Letters Patent, is—

1. A combined cart-box and scraper or shovel, in combination with the front self-acting end-boards and the self-fastening rear-end door, substantially as set forth and described.

2. The connecting or draught-frame C, together with the combination of the foot-lever G, the hand-lever H, and the slotted tongue U, substantially as set forth and described.

3. The application of the draught to the box A at the rear of and below the axle by fastening the ends of the frame C to said box, and the change of draught from the rear to the front of said box A by the use of the bail E and the slotted tongue U, substantially as set forth and described.

4. The drop and hoist-levers D D, pivoted in front of the axle, for the purposes and substantially as set forth and described.

5. A self-loading cart, constructed of the parts lettered from A to V respectively, in the manner and for the purposes herein set forth and described.

W. T. NICHOLS.

Witnesses:
  W. A. BENNETT,
  GEORGE A. NOLEN.